Dec. 15, 1931.  B. BURVENICK  1,837,109
UTENSIL HANDLE
Filed May 24, 1930
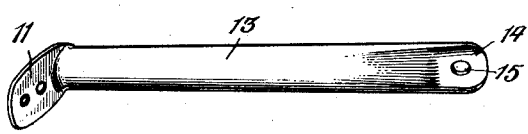
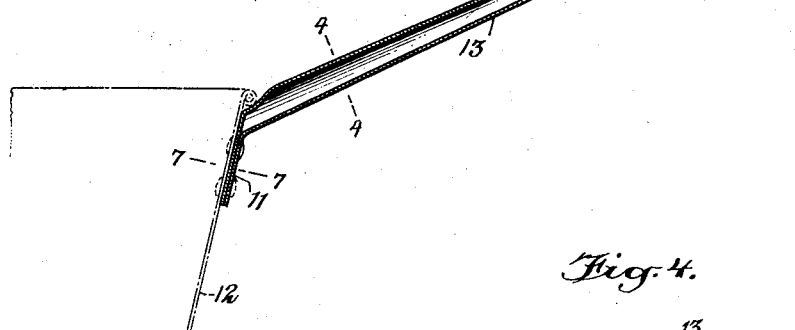
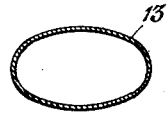
INVENTOR
Benjamin Burvenick
BY
ATTORNEYS
WITNESSES Patented Dec. 15, 1931

1,837,109

UNITED STATES PATENT OFFICE

BENJAMIN BURVENICK, OF WOODHAVEN, NEW YORK, ASSIGNOR TO LALANCE & GROSJEAN MANUFACTURING COMPANY, OF WOODHAVEN, NEW YORK, A CORPORATION OF NEW YORK

UTENSIL HANDLE

Application filed May 24, 1930. Serial No. 455,371.

This invention relates to an improved handle for utensils or the like and also to a method of producing the same.

Due to the fact that nickel chromium steel or similar metal alloys are subject to discoloration by oxidization, it is evident that the construction of a hollow handle by shaping a sheet of said metal and forming a seam by welding, brazing or other similar methods would require a resurfacing operation to remove the discoloration.

In order, therefore, to avoid the time, labor and expense incident to a resurfacing operation, the present invention comprehends the formation or fashioning of a handle from a length of seamless tubing by pressing the same into the desired configuration and at the same time cutting and closing the opposite ends to render the same liquid tight.

With the above recited and other objects in view, reference is had to the following description and accompanying drawings, in which there is exhibited one example or embodiment of the invention, while the claims define the actual scope of the same.

In the drawings:

Figure 1 is a perspective view of a length of tubing of the type from which the handle is to be constructed.

Figure 2 is a perspective view of a finished handle constructed in accordance with the invention.

Figure 3 is a longitudinal sectional view through a handle constructed in accordance with the invention, and illustrating in broken lines a portion of a utensil to which the handle is applied.

Figures 4, 5, 6 and 7 are transverse sectional views through the completed handle, taken approximately on the lines 4—4, 5—5, 6—6 and 7—7 of Figure 3.

Referring to the drawings by characters of reference, a length of seamless tubing 10 as illustrated in Figure 1 is pressed or otherwise fashioned so that the end 11 which is to be secured to the utensil 12 is disposed at an angle to the remainder of the handle body 13. The pressing of the end 11 flattens the same so that the bore of the tube at this point is completely closed and sealed against the ingress of liquids. The opposite free end 14 is similarly pressed together to close the bore and, if desired, may be perforated or apertured as at 15 to afford means for engagement over a suitable supporting hook or nail to hang up the utensil. This obviously provides a hollow handle which is liquid tight and which is completely formed without resorting to welding, brazing or similar operations of this nature which require the application of heat and which cause the oxidization of the class of metal alloys above specified. It is, of course, apparent that the cross sectional shape of a handle may be varied from that illustrated, which has been merely employed to demonstrate one way of shaping the handle.

From the foregoing, it will thus be seen that a handle and method of making the same has been devised, by virtue of which nickel chromium steel or similar metal alloys may be employed in the manufacture of such handle without necessitating a resurfacing operation for the removal of discoloration by oxidization.

What is claimed is:

1. The method of making hollow handles for utensils or like articles from lengths of seamless nickel-chromium-steel or similar alloy tubing, comprising pressing the ends of the tubing closely together and simultaneously cutting off the extremities of the lengths of tubing to the desired configuration to render the same liquid tight, fashioning a portion of the tubing at one end thereof to conform to the surface of the article to which it is to be applied, and bending the said fashioned portion at an angle to the remainder of the length of tubing.

2. A hollow handle for utensils or like articles comprising a length of seamless tubing having closely pressed-together opposite end portions extending inwardly from the extremities thereof rendering the same liquid tight, one of said end portions being disposed at an angle to the remainder of the length of tubing and conforming to the surface of the article to which it is to be applied.

Signed at Woodhaven, L. I., in the county of Queens and State of New York this 17th day of May, 1930.

BENJAMIN BURVENICK.